United States Patent [19]

Wruk

[11] Patent Number: 4,515,251
[45] Date of Patent: May 7, 1985

[54] ELECTROMAGNETIC BRAKE WITH IMPROVED ARMATURE MOUNTING

[75] Inventor: Thomas J. Wruk, Belvidere, Ill.

[73] Assignee: Warner Electric Brake & Clutch Company, South Beloit, Ill.

[21] Appl. No.: 461,115

[22] Filed: Jan. 26, 1983

[51] Int. Cl.³ .................. B60T 13/04; H01F 7/14; H01F 7/16

[52] U.S. Cl. .................. 188/171; 188/206 R; 335/275; 335/276

[58] Field of Search .................. 188/29, 72.3, 73.31, 188/73.39, 74, 75, 161, 76, 164, 171, 165, 205 R, 205 A, 206 R, 206 A, 216, 250 D, 250 F, 250 G, 250 B; 16/225, 226; 310/77, 78, 92, 93; 335/275, 276; 192/79, 90, 109 A, 109 B, 18 B

[56] References Cited

U.S. PATENT DOCUMENTS

| 2,164,521 | 7/1939 | Hodgson | 188/171 |
| 2,483,304 | 9/1949 | Vogel | 16/226 |
| 3,624,767 | 11/1971 | Kroeger | 192/18 B |
| 4,023,655 | 5/1977 | Anzai et al. | 188/171 |
| 4,056,171 | 11/1977 | Tickle | 188/74 |
| 4,235,311 | 11/1980 | Brinkmann et al. | 188/72.3 |
| 4,338,585 | 7/1982 | Volke | 335/275 |

FOREIGN PATENT DOCUMENTS

| 2040287 | 2/1972 | Fed. Rep. of Germany | 188/171 |
| 2230949 | 1/1973 | Fed. Rep. of Germany | 188/73.31 |
| 1315934 | 5/1973 | United Kingdom | 188/171 |
| 223537 | 10/1968 | U.S.S.R. | 188/74 |

OTHER PUBLICATIONS

*Official Gazette* Publication of Volke Patent 4,338,585.

Primary Examiner—Douglas C. Butler
Assistant Examiner—Richard R. Diefendorf
Attorney, Agent, or Firm—Leydig, Voit, Osann, Mayer & Holt, Ltd.

[57] ABSTRACT

A resiliently flexible strip device mounts the armature of an electrically released brake for movement toward and away from the pole faces of the field shell, the armature either moving with pivotal motion or with linear motion. The resiliently flexible strip device may take the form of one or more leaf springs or may be one or more tongues molded integrally with the flange of a bobbin which forms part of the coil of the brake. A piece of flexible friction material is bonded to a curved pad on the outer face of the armature and automatically takes on the curved shape of the pad.

11 Claims, 13 Drawing Figures

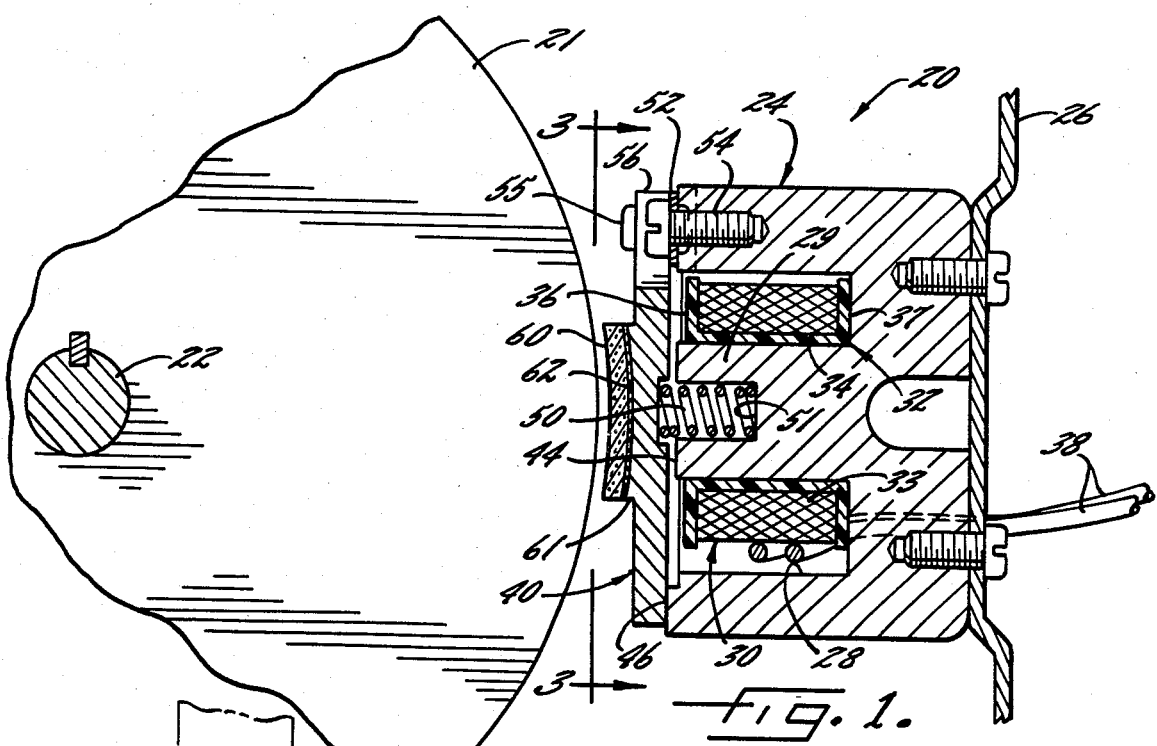
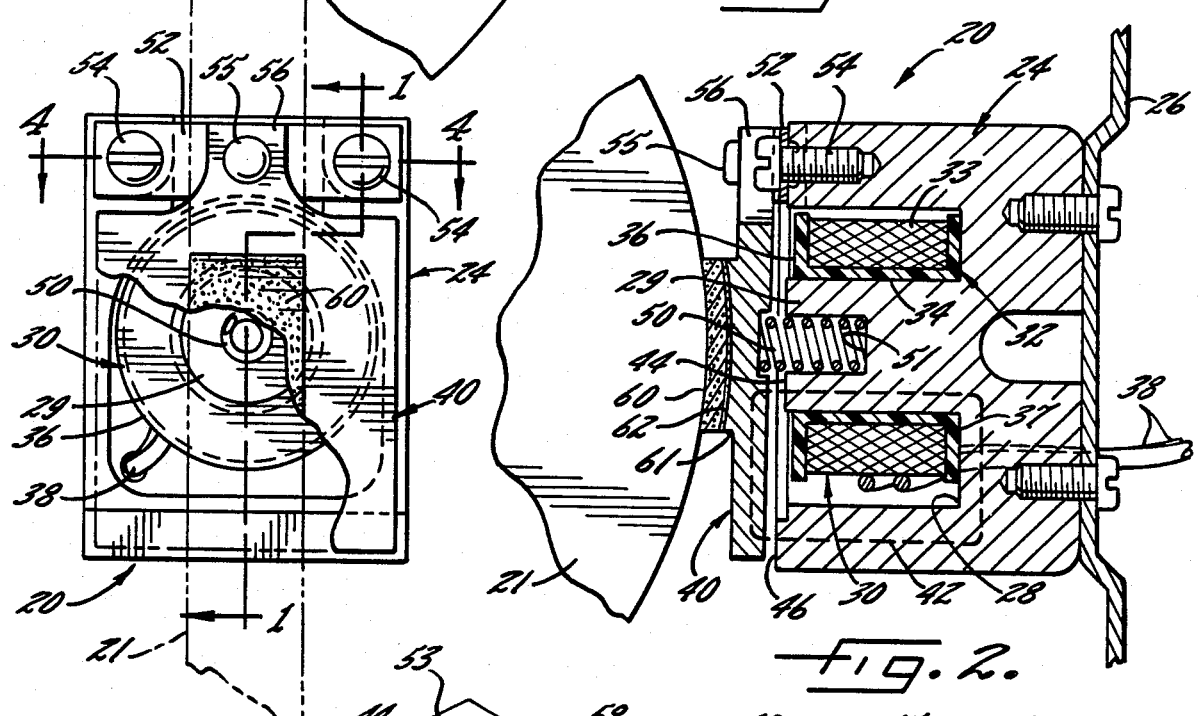
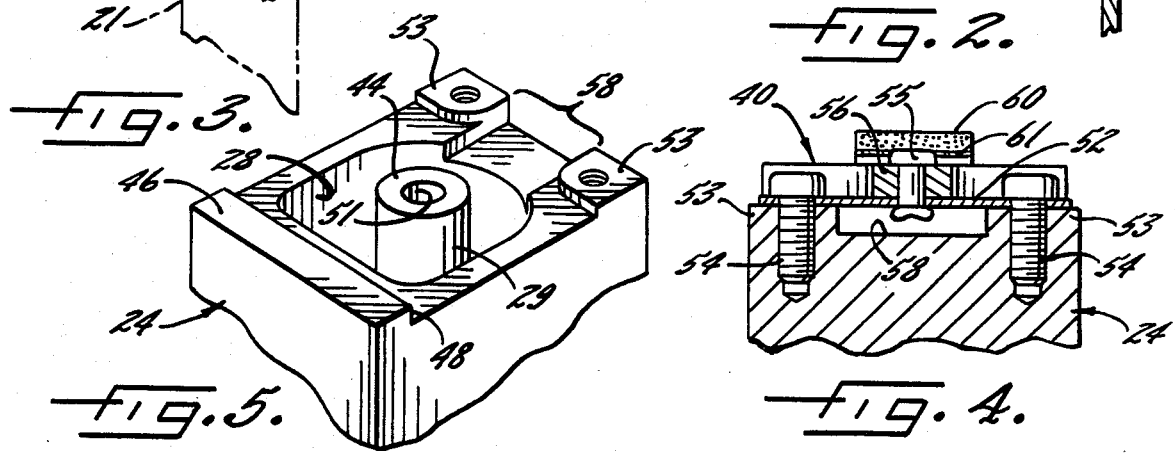

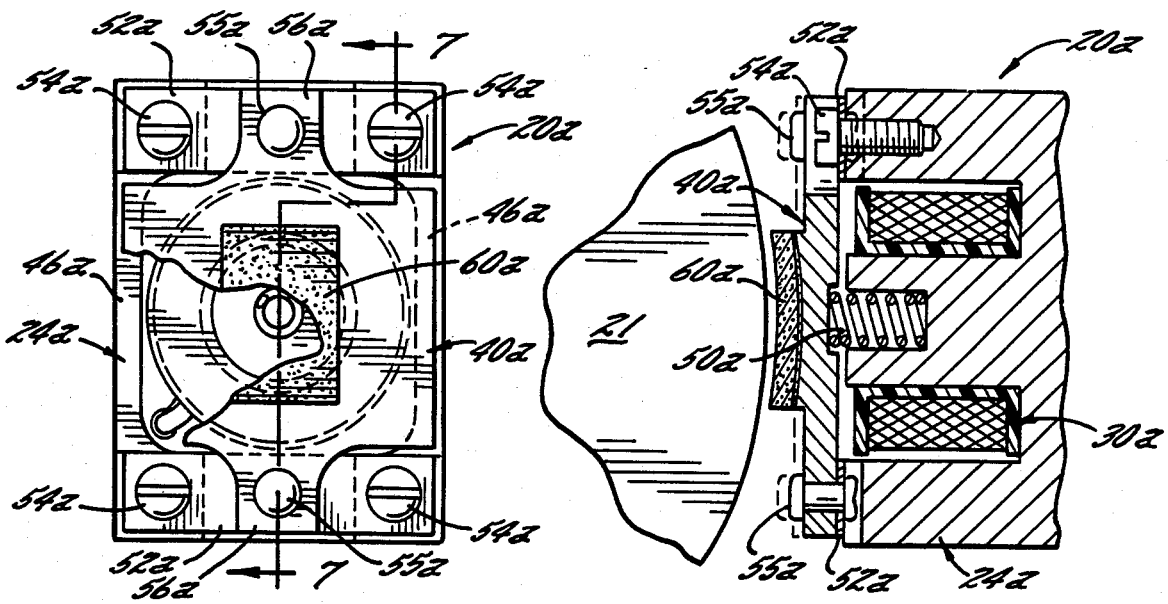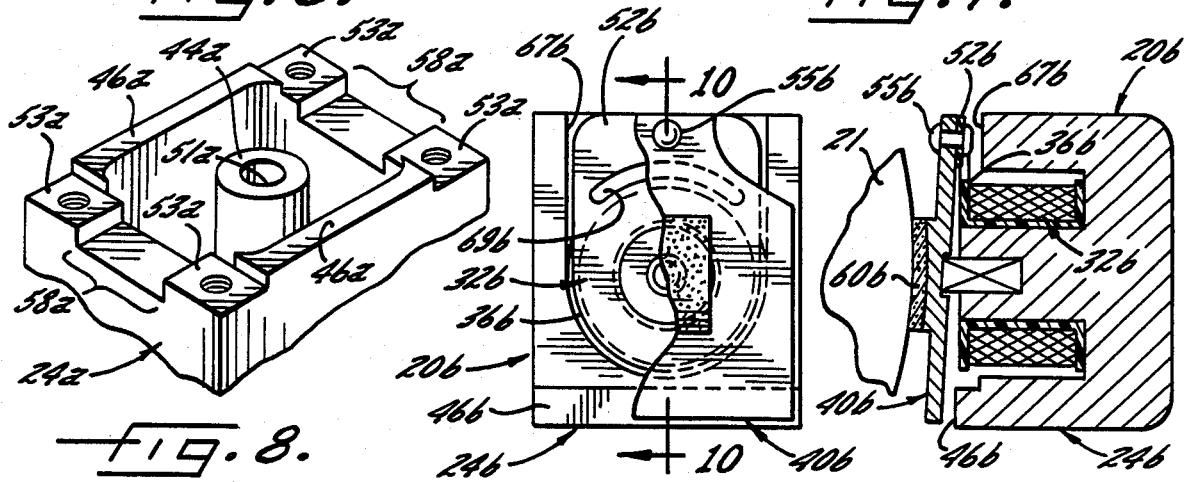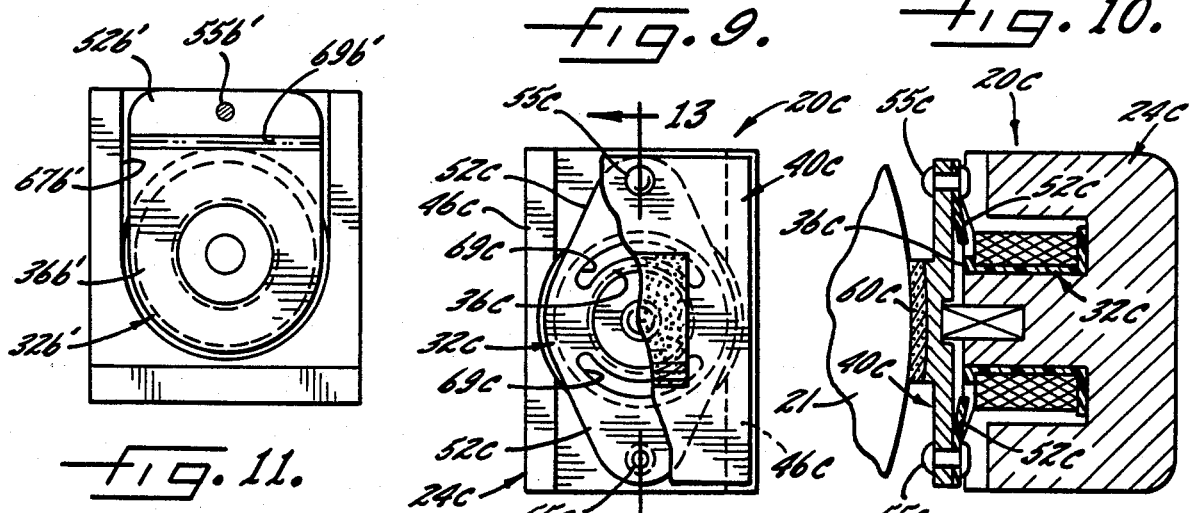

ELECTROMAGNETIC BRAKE WITH IMPROVED ARMATURE MOUNTING

BACKGROUND OF THE INVENTION

This invention relates to an electromagnetic brake which is selectively operable to retard a rotary member such as a cylindrical disc or shaft. More particularly, the invention relates to an electromagnetic brake of the type which includes a field shell having magnetic poles and supporting an electric coil. The coil comprises a multi-turn winding which preferably but not necessarily is wound on the spool of a bobbin molded of resiliently flexible material and having annular flanges at the ends of the spool.

When the coil is de-energized, a spring urges an armature away from the shell and into engagement with the rotating member. As an incident thereto, friction material on the outer face of the armature applies a retarding force to the rotating member. When energized, the coil produces magnetic flux which attracts the armature toward the poles and away from the rotating member so as to release the retarding force.

SUMMARY OF THE INVENTION

The general aim of the present invention is to provide an electromagnetic brake of the foregoing type in which the armature is mounted on the shell in a new and improved manner which permits the armature to move on the shell and toward and away from the rotary member with low friction and with negligible backlash in the direction of rotation.

A more detailed object is to achieve the foregoing by mounting the armature on the shell by means of a resiliently yieldable strip which allows substantially free movement of the armature toward and away from the shell while avoiding backlash between the armature and the shell when the armature applies retarding torque to the rotary member.

Another object of the invention is to mount the armature for pivotal movement on the shell by means of a leaf spring which flexes to allow the armature to pivot but which remains stiff in the direction of rotation of the rotary member so as to virtually eliminate backlash.

Still another object of the invention is to advantageously use the flange of the coil bobbin as a means for mounting the armature for back and forth movement thereby to enable the overall cost of the brake to be reduced.

The invention also resides in the novel formation of the outer face of the armature to enable a curved friction face to be applied to the armature in a simple and inexpensive manner.

These and other objects and advantages of the invention will become more clear from the following detailed description when taken in conjunction with the accompanying drawings.

BRIEF DESCRIPTION OF THE DRAWINGS

FIG. 1 is a cross-sectional view of one embodiment of a new and improved electromagnetic brake incorporating the unique features of the present invention, the view being taken substantially along the line 1—1 of FIG. 3 and showing the armature of the brake in a released position.

FIG. 2 is a view similar to FIG. 1 but shows the armature in a braking position.

FIG. 3 is an elevational view taken along the line 3—3 of FIG. 1, part of the armature being broken away.

FIG. 4 is a fragmentary cross-section taken substantially along the line 4—4 of FIG. 3.

FIG. 5 is a fragmentary perspective view of the field shell of the electromagnet.

FIG. 6 is a view similar to FIG. 3 but shows a second embodiment of an electromagnetic brake according to the invention.

FIG. 7 is a fragmentary cross-section taken substantially along the line 7—7 of FIG. 6.

FIG. 8 is a fragmentary perspective view showing the field shell of the electromagnet of the brake shown in FIGS. 6 and 7.

FIG. 9 is another view similar to FIG. 3 but on a reduced scale and showing a third embodiment of a brake according to the invention.

FIG. 10 is a cross-section taken substantially along the line 10—10 of FIG. 9.

FIG. 11 is a view similar to FIG. 9 but shows a modification of the brake illustrated in FIG. 9.

FIG. 12 is another view similar to FIG. 9 but shows yet another embodiment of a brake according to the invention.

FIG. 13 is a cross-section taken substantially along the line 13—13 of FIG. 12.

DETAILED DESCRIPTION OF THE PREFERRED EMBODIMENTS

As shown in the drawings for purposes of illustration, the invention is embodied in an electromagnetic brake 20 which is selectively operable to retard or stop a rotary member 21. In this particular instance, the rotary member has been shown as being a cylindrical disc which is carried on the end of a power-rotated shaft 22. The brake, the disc and the shaft could, for example, be incorporated in a computerized business machine.

The brake 20 includes a main field shell 24 which is anchored in a fixed position on a support bracket 26. The present field shell is shaped generally as a parallelepiped and preferably is molded of powdered metal. An annular cavity 28 (FIG. 5) is formed in the shell and opens out of the outer side of the shell, there being a post 29 located at the center of the cavity and formed integrally with the shell. Telescoped into the cavity and over the post is an annular coil 30 (FIGS. 1 and 2) comprising a tubular bobbin 32 and a multiturn winding 33. The bobbin is molded of plastic or other resiliently yieldable material and includes a cylindrical spool 34 and two radially outwardly projecting flanges 36 and 37 integral with opposite ends of the spool. The winding 33 is wound around the spool 34, is captivated between the flanges 36 and 37 and includes lead wires 38 adapted to be connected to a suitable voltage source (not shown).

When energized, the winding 33 produces magnetic flux which acts to draw a rectangular plate-like armature 40 away from the disc 21 and toward the shell 24 (see FIG. 1). The magnetic flux threads a path 42 shown in dot-dash lines in FIG. 2 and cuts across a narrow air gap between the armature 40 and two magnetic poles 44 and 46. The pole 44 is defined by the outer end of the post 29 while the pole 46 is defined by the outer face of a narrow rib 48 (see FIG. 5) formed integrally with and projecting outwardly from one end portion of the shell 24.

When the winding 33 is de-energized, a coil spring 50 urges the armature 40 away from the shell 24 and into braking engagement with the rotary disc 21 as shown in FIG. 2. The coil spring is telescoped into a hole 51 (see FIGS. 2 and 5) in the post 29 and is compressed between the bottom of the hole and the inner face of the armature 40.

In the brake 20 shown in FIGS. 1 to 5, the armature 40 is mounted on one end portion of the shell 24 to pivot toward and away from the rotary disc 21. Thus, the armature pivots away from the disc and toward the poles 44 and 46 when the winding 33 is energized to produce magnetic flux. Conversely, the armature pivots into braking engagement with the disc and away from the poles when the winding is de-energized to interrupt the flux and to release the armature to the action of the spring 50.

In accordance with the present invention, the armature 40 is uniquely mounted to pivot inwardly and outwardly on the shell 24 with low friction and with negligible backlash in the direction of rotation of the rotary disc 21. This is achieved by mounting the armature on the shell by means of a resiliently yieldable strip 52 (FIGS. 1 to 4) which flexes to allow substantially free pivotal motion of the armature while preventing the armature from moving bodily relative to the shell during the pivoting and when the armature is in engagement with the disc.

In the embodiment of the brake 20 shown in FIGS. 1 to 5, the strip 52 is in the form of a flat, elongated leaf spring made of spring steel. The leaf spring 52 is located at the end of the shell 24 opposite the rib 48, is disposed in a plane extending parallel to the plane of the armature 40 and extends lengthwise in the same direction as the axis of the disc 21. The end portions of the leaf spring 52 engage outwardly projecting pads 53 (FIG. 5) formed on the end portion of the shell and are secured tightly to the shell by screws 54 (FIG. 4) extending through the spring and threaded into holes in the shell. A rivet 55 extends through a tab 56 integral with one end of the armature and connects the armature tightly to the center of the leaf spring 52. The intermediate portion of the spring overlies a notch 58 (FIGS. 4 and 5) which is formed in the shell 24 to allow the spring to flex in a twisting mode about its longitudinal axis.

With the foregoing arrangement, the leaf spring 52 is capable of flexing or twisting back and forth about its longitudinal axis and between the screws 54 so as to support the armature 40 for pivotal movement toward and away from the rotary disc 21. The leaf spring imparts very little force to inhibit free pivotal motion of the armature over the narrow range through which the armature swings. At the same time, the leaf spring is stiff in the plane of the armature and direction of rotation of the disc and is secured tightly to both the armature and the shell 24 so as to prevent backlash or play between the two.

The armature 40 also preferably is molded of powdered metal. The metal armature does not directly engage the rotary disc 21 but instead a piece 60 of flexible friction material (e.g., asbestos-free cork rubber) is secured to the outer face of the armature and frictionally engages the disc (see FIG. 2). To establish a good braking action, it is desirable for the outer face of the friction material 60 to be curved on the same radius and about the same axis as the periphery of the disc so that the friction material will conform to the disc. It is rather difficult and expensive, however, to machine the outer face of the friction material to have such a curvature.

According to another feature of the invention, the outer face of the friction material 60 is curved in a very simple and inexpensive manner. This is achieved by molding a raised pad 61 (FIGS. 2 and 4) on the outer side of the armature 40 and by forming the pad such that its outer face 62 is of the desired curvature. When the flexible friction material 60 is bonded to the curved pad, the outer face of the friction material flexes and assumes the same curvature as the pad and thus it is not necessary to form a curvature in the friction material by machining or the like.

Accordingly, the pad 61 is molded integrally with and projects outwardly from the outer side of the powdered metal armature 40 and is molded with a concavely curved outer face 62 having approximately the same radius as the outer periphery of the rotary disc 21. The friction material 60 is flexed and is bonded to the outer face of the pad so that the outer face of the friction material automatically assumes a concavely curved shape to conform to the disc 21.

Another embodiment of a brake 20a incorporating the features of the invention is shown in FIGS. 6 to 8. In this instance, the armature 40a is mounted for linear movement toward and away from the disc 21. For this purpose, both ends of the armature 40a are mounted on the shell by leaf springs 52a which are identical to the spring 52 of the brake 20. The springs are recessed somewhat in the end portions of the shell 24a and are located below the side margins of the shell, the side margins defining poles 46a (FIG. 8) which coact with the center pole 44a to establish a path for the magnetic flux.

Still another embodiment of a brake 20b is shown in FIGS. 9 and 10 and is characterized particularly by the fact that the armature 40b is mounted on a resiliently yieldable strip 52b at very little cost. As shown in FIG. 9, the strip 52b is defined by a tongue molded integrally with and projecting radially from the outer flange 36b of the bobbin 32b. The tongue 52b extends through a notch 67b formed in one end portion of the shell 24b and is fastened to the armature by a plastic rivet 55b. The latter extends through holes in the armature and the tongue and is heat staked to the tongue.

Thus, the resiliently flexible tongue 52b mounts the armature 40b for back and forth pivotal motion substantially the same as the leaf spring 52 of the brake 20. The tongue, however, may be molded very inexpensively when the bobbin 32b is formed and, as such, eliminates the need for a separate leaf spring as well as the screws 54 and the labor of installing the screws.

To increase the hingeability of the tongue 52b, a banana-shaped slot 69b (FIG. 9) may be formed between the tongue and the bobbin flange 36b when the bobbin 32b is molded. Alternatively, a so-called "living" hinge may be provided by molding a groove 69b' between the tongue 52b' and the flange 36b' as shown in FIG. 11.

FIGS. 12 and 13 show another brake 20c which is similar to the brake 20b except that the armature 40c is mounted for linear motion rather than pivotal motion. Thus, two oppositely projecting tongues 52c are molded integrally with the outer flange 36c of the bobbin 32c and are connected to opposite ends of the armature by plastic rivets 55c. The tongues are recessed in the shell 24c with the side margins of the shell defining pole faces 46c.

I claim:

1. An electromagnetic brake for retarding a rotary member adapted to rotate about a predetermined axis, said brake comprising a field shell having at least two magnetic poles, an armature, spring means for urging said armature away from said poles and into braking engagement with the rotary member, and an electric coil supported by said shell and operable when excited to produce magnetic flux for drawing said armature away from the rotary member and toward said poles, the improvement in said brake comprising, a substantially flat and resiliently flexible leaf spring having a longitudinal axis which extends substantially parallel to the axis of the rotary member, said leaf spring having end portions fixed to said shell and having an intermediate portion fixed to one end portion of said armature, the intermediate portion of said leaf spring being capable of twisting relative to the end portions of the leaf spring to mount said armature for swinging toward and away from said poles about an axis coinciding with the longitudinal axis of the leaf spring.

2. An electromagnetic brake for retarding a rotary member adapted to rotate about a predetermined axis, said brake comprising a field shell having at least two magnetic poles, an armature having opposite end portions, spring means for urging said armature away from said poles and into braking engagement with the rotary member, and an electric coil supported by said shell and operable when excited to produce magnetic flux for drawing said armature away from the rotary member and toward said poles, the improvement in said brake comprising, a resiliently yieldable leaf spring located between said shell and one end portion of said armature and having a longitudinal axis extending generally parallel to the axis of the rotary member, said leaf spring having end portions fixed to said shell and having an intermediate portion fixed to said one end portion of said armature, the opposite end portion of said armature being free of any connection with said shell, the intermediate portion of the leaf spring twisting relative to the end portions thereof to mount said armature for swinging about an axis coinciding with the longitudinal axis of the leaf spring.

3. An electromagnetic brake for retarding a rotary member adapted to rotate about a predetermined axis, said brake comprising a field shell having at least two magnetic poles, an armature having opposite end portions, spring means for urging said armature away from said poles and into braking engagement with the rotary member, an electric coil supported by said shell and operable when excited to produce magnetic flux for drawing said armature away from the rotary member and toward said poles, said coil comprising a bobbin having an annular flange on one end thereof and further comprising a multi-turn winding wound on said bobbin, said flange extending substantially parallel to said armature, the improvement in said brake comprising, a tongue formed integrally with and projecting radially from the flange of said bobbin and having a free end portion secured to one end portion of said armature, and means between said tongue and said flange permitting said tongue to flex relative to said flange whereby said tongue mounts said armature for movement toward and away from said poles.

4. An electromagnetic brake as defined in claim 3 in which said flange and said tongue are made of resiliently flexible material, said last-mentioned means comprising a slot formed through said material and located between said flange and said tongue.

5. An electromagnetic brake as defined in claim 3 in which said flange and said tongue are made of resiliently flexible material, said last-mentioned means comprising a groove formed in said material and located between said flange and said tongue.

6. An electromagnetic brake as defined in claim 3 in which the opposite end portion of said armature is free of any connection with said shell, said tongue mounting said armature for back and forth swinging about an axis extending generally parallel to the axis of the rotary member.

7. An electromagnetic brake as defined in claim 3 further comprising a second tongue formed integrally with and projecting radially from the flange of said bobbin and having a free end portion secured to the opposite end portion of said armature, and means between said second tongue and said flange permitting said second tongue to flex relative to said flange whereby said tongues mount said armature for substantially linear movement toward and away from said poles.

8. An electromagnetic brake for retarding a rotary member adapted to rotate about a predetermined axis, said brake comprising a field shell having at least two magnetic poles, an armature, spring means for urging said armature away from said poles and into braking engagement with the rotary member, and an electric coil supported by said shell and operable when excited to produce magnetic flux for drawing said armature away from the rotary member and toward said poles, said coil comprising a bobbin having an annular flange at one end thereof and further comprising a multi-turn winding wound on said bobbin, the improvement in said brake comprising, a substantially flat strip having a first portion fixed relative to said shell and having a second portion fixed to said armature, said flange constituting said first portion of said strip, and a tongue formed integrally with and projecting radially from said flange and constituting said second portion of said strip, said tongue being fixed to said armature and being capable of hinging relative to said flange to mount said armature for swinging toward and away from said poles about an axis extending generally parallel to the axis of the rotary member.

9. An electromagnetic brake as defined in claim 8 in which said flange and said tongue are made of resiliently flexible material, there being a slot formed through said material between said flange and said tongue to facilitate hinging of said tongue relative to said flange.

10. An electromagnetic brake as defined in claim 8 in which said flange and said tongue are made of resiliently flexible material, there being a groove formed in said material between said flange and said tongue to facilitate hinging of said tongue relative to said flange.

11. An electromagnetic brake for retarding a rotary member adapted to rotate about a predetermined axis, said brake comprising a field shell having at least two magnetic poles, an armature having opposite end portions, spring means for urging said armature away from said poles and into braking engagement with the rotary member, and an electric coil supported by said shell and operable when excited to produce magnetic flux for drawing said armature away from the rotary member and toward said poles, said coil comprising a bobbin having an annular flange at one end thereof and further comprising a multi-turn winding wound on said bobbin, the improvement in said brake comprising, two substantially flat strips located adjacent opposite end portions of said armature, each of said strips having a first portion fixed relative to said shell and having a second portion fixed to said armature, the first portion of each of said strips being constituted by said flange, tongues formed integrally with and projecting radially in opposite directions from said flange and constituting the second portions of said strips, said tongues being fixed to the opposite end portions of said armature and being capable of flexing relative to said flange to mount said armature for substantially linear movement toward and away from said poles.

* * * * *